United States Patent
Liao et al.

(10) Patent No.: US 11,607,872 B2
(45) Date of Patent: Mar. 21, 2023

(54) BIAXIALLY STRETCHED POLYESTER FILM AND METHOD FOR PRODUCING THE SAME

(71) Applicant: NAN YA PLASTICS CORPORATION, Taipei (TW)

(72) Inventors: Te-Chao Liao, Taipei (TW); Wen-Cheng Yang, Taipei (TW); Hao-Sheng Chen, Taipei (TW); Chia-Yen Hsiao, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 0 days.

(21) Appl. No.: 16/785,707

(22) Filed: Feb. 10, 2020

(65) Prior Publication Data

US 2021/0053331 A1   Feb. 25, 2021

(30) Foreign Application Priority Data

Aug. 20, 2019  (TW) .................. 108129698

(51) Int. Cl.
*B32B 27/36* (2006.01)
*B32B 27/08* (2006.01)
(Continued)

(52) U.S. Cl.
CPC .............. *B32B 27/36* (2013.01); *B32B 3/26* (2013.01); *B32B 27/08* (2013.01); *B32B 27/20* (2013.01);
(Continued)

(58) Field of Classification Search
CPC ...... B32B 2264/3065; B32B 2307/408; B32B 27/36; B32B 2250/244; B32B 2307/412;
(Continued)

(56) References Cited

U.S. PATENT DOCUMENTS 3,154,461 A    10/1964   Johnson
6,358,604 B1 *  3/2002   Peiffer ................ B32B 27/20
                                               428/336
(Continued)

FOREIGN PATENT DOCUMENTS

CN    101134865 A    3/2008
CN    101426646 A    5/2009
(Continued)

OTHER PUBLICATIONS

Devi, Temperature Dependence of Unperturbed Dimension and Interaction Parameters of Polyester Resin in Solvents, 1994, Polymer International, vol. 34, pp. 257-265. (Year: 1994).*

(Continued)

*Primary Examiner* — Monique R Jackson
(74) *Attorney, Agent, or Firm* — Li & Cai Intellectual Property (USA) Office (57) ABSTRACT

A biaxially stretched polyester film and a method for producing the same are provided. The biaxially stretched polyester film includes a polyester resin base layer and a matte layer formed on the polyester resin base layer. The matte layer has a total weight of 100 wt %, and the matte layer includes: (1) 50 to 95 wt % of a polyester resin matrix, an intrinsic viscosity of the polyester resin matrix being between 0.5 and 0.8 dL/g; (2) 0.01 to 5 wt % of a high viscosity polyester resin, an intrinsic viscosity of the high viscosity polyester resin being between 0.9 and 1.1 dL/g; (3) 0.3 to 40 wt % of a plurality of filler particles, the filler particles having an average particle size of between 0.15 and 10 µm.

3 Claims, 3 Drawing Sheets

(51) Int. Cl.
  *B32B 27/20* (2006.01)
  *B32B 3/26* (2006.01)
  *C08J 5/18* (2006.01)
(52) U.S. Cl.
  CPC .............. *C08J 5/18* (2013.01); *B32B 2250/02* (2013.01); *B32B 2250/244* (2013.01); *B32B 2264/102* (2013.01); *B32B 2264/104* (2013.01); *B32B 2264/12* (2013.01); *B32B 2264/3065* (2020.08); *B32B 2307/408* (2013.01); *B32B 2307/412* (2013.01); *B32B 2307/518* (2013.01); *B32B 2307/538* (2013.01); *B32B 2367/00* (2013.01)
(58) Field of Classification Search
  CPC . B32B 27/08; B32B 27/20; B32B 2264/0278; B32B 2264/0285; B32B 2307/518; B32B 2307/538
  See application file for complete search history.

(56) References Cited

U.S. PATENT DOCUMENTS

| | | | | |
|---|---|---|---|---|
| 2002/0071945 | A1* | 6/2002 | Peiffer | B32B 27/36 428/327 |
| 2004/0130059 | A1* | 7/2004 | Kern | C08J 11/06 264/173.16 |
| 2004/0151897 | A1* | 8/2004 | Konrad | B32B 27/36 428/327 |
| 2009/0123756 | A1* | 5/2009 | Hashimoto | B32B 5/18 428/409 |
| 2010/0307503 | A1* | 12/2010 | Iwamoto | B32B 5/26 128/205.29 |
| 2021/0086489 | A1* | 3/2021 | Liao | C08J 5/18 |

FOREIGN PATENT DOCUMENTS

| | | |
|---|---|---|
| CN | 104385609 A | 3/2015 |
| CN | 105682893 A | 6/2016 |
| CN | 108034065 A | 5/2018 |
| CN | 106313828 B | 2/2019 |
| DE | 2353347 A1 | 5/1974 |
| EP | 0053498 B1 | 3/1985 |
| JP | 2002200723 A | 7/2002 |
| JP | 2003176400 A | 6/2003 |
| JP | 2004230893 A | 8/2004 |
| JP | 2008143024 A | 6/2008 |
| JP | 2009214489 A | 9/2009 |
| JP | 2010150328 A | 7/2010 |
| JP | 2010194905 A | 9/2010 |
| JP | 2013129075 A | 7/2013 |
| JP | 201771107 A | 4/2017 |
| WO | WO 2007123095 A1 | 11/2007 |
| WO | WO 2015072163 A1 | 5/2015 |
| WO | 2016080174 A1 | 5/2016 |

OTHER PUBLICATIONS

Mehrdad, Effect of Temperature and Solvent Composition on the Intrinsic Viscosity of Poly(ethylene glycol) in Water-Ethanol Solutions, 2010, J. Chem. Eng. Data, vol. 55, pp. 2537-2541. (Year: 2010).*

Machine translation of JP2008-143024A (powered by EPO and Google), published Jun. 2008. (Year: 2008).*

Zeomic product information—Considerations for Treatment of Plastics, Sinanen Zeomic, retrieved on Jul. 20, 2021 from https://www.zeomic.co.jp/en/product/zeomic/documents/plastic.pdf (Year: 2021).*

* cited by examiner

BIAXIALLY STRETCHED POLYESTER FILM AND METHOD FOR PRODUCING THE SAME

CROSS-REFERENCE TO RELATED PATENT APPLICATION

This application claims the benefit of priority to Taiwan Patent Application No. 108129698, filed on Aug. 20, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polyester film, and more particularly to a biaxially stretched polyester film and a method for producing the same.

BACKGROUND OF THE DISCLOSURE

Compared to the general plastic films produced by the cast film process or the blown film process, the biaxially stretched polyester films (also called biaxially oriented polyester film, BOPET film) produced by the biaxial stretching process have good performance and wide application. Accordingly, the biaxial stretching process is the main method for producing the polyester film. However, in certain applications, the physicochemical properties of the conventional biaxially stretched polyester films still have many issues to be addressed.

For example, U.S. Pat. No. 3,154,461A discloses a matte-finish polymeric film prepared from a thermoplastic such as polyethylene terephthalate or polypropylene. The film includes incompressible particles (i.e. calcium carbonate particles or silicon oxide particles) having a particle size of between 0.3 μm and 20 μm and a concentration of between 1 wt % and 25 wt %. However, the film has a mattness that is unsatisfactory for many applications thereof.

German Patent No. DE2353347A1 discloses a method for producing a milky polyester film having one or more layer structures. The method includes preparing a mixture including linear polyester particles, and the mixture further includes 3 wt % to 27 wt % of homo-polymer or co-polymer of ethylene or propylene. The method further includes extruding the mixture into a film; quenching the film; orienting the film along a direction perpendicular to the film, and then heat setting the film. The drawbacks of this method is that the scrap material (essentially a mixture of polyester and ethylene copolymer or propylene copolymer) generated during the preparation of the film cannot be recycled for use as a regrind material, and further causes the problem of yellowing on the finally produced film. This method is not economical, and the yellow film produced with the regrind scrap material is commercially unacceptable.

European Patent No. EP0053498B1 discloses a biaxially oriented multilayer polyester film. The polyester film has a transparent base layer (B) and an additional layer (A) having a matte appearance applied to at least one side of the transparent base layer (B). The matte appearance layer (A) consists essentially of a co-polyester having polyethylene terephthalate and a plurality of inert inorganic particles having an average diameter of between 0.3 μm and 20 μm. Based on the total weight of the layer having the matt appearance, the content of the inert inorganic particles is between 3 wt % to 40 wt %. The film has a high degree of matteness (i.e. a gloss value of less than 15) and a transparency of greater than 60%. However, this film is still insufficient in some application or markets.

SUMMARY OF THE DISCLOSURE

In response to the above-referenced technical inadequacies, the present disclosure provides a biaxially stretched polyester film and a method for producing the same.

In one aspect, the present disclosure provides a biaxially stretched polyester film including a polyester resin base layer and a matte layer formed on a side surface of the polyester resin base layer. The matte layer includes: a polyester resin matrix, a high viscosity polyester resin, and a plurality of filler particles. Based on the total weight of the matte layer, (1) a content of the polyester resin matrix is between 50 wt % and 95 wt %, in which an intrinsic viscosity of the polyester resin matrix is between 0.5 dL/g and 0.8 dL/g; (2) a content of the high viscosity polyester resin is between 0.01 wt % and 5 wt %, in which the high viscosity polyester resin is dispersed in the polyester resin matrix, and an intrinsic viscosity of the high viscosity polyester resin is between 0.9 dL/g and 1.1 dL/g; and (3) a content of the plurality of filler particles is between 0.3 wt % and 40 wt %, in which the plurality of filler particles are also dispersed in the polyester resin matrix, and the plurality of filler particles have an average particle size of between 0.15 μm and 10 μm.

In one aspect, the present disclosure provides a method for producing a biaxially stretched polyester film which includes: feeding a polyester resin base material into a first extruder; feeding a polyester resin matrix material, a high viscosity polyester resin material, and a plurality of filler particles into a second extruder; using a co-extrusion method to co-extrude the polyester resin base material disposed in the first extruder, and the polyester resin matrix material, the high viscosity polyester resin material and the plurality of filler particles disposed in the second extruder, so that the polyester resin base material is formed into a polyester resin base layer, and the polyester resin matrix material, the high viscosity polyester resin material, and the plurality of filler particles are collectively formed into a matte layer that is disposed on a side surface of the polyester resin base layer; and biaxially stretching an un-stretched polyester film formed by the polyester resin base layer and the matte layer, so that a biaxially stretched polyester film is formed. In addition, based on the total weight of the matte layer, a content of the polyester resin matrix material is between 50 wt % and 95 wt %, a content of the high viscosity polyester resin material is between 0.01 wt % and 5 wt %, and a content of the plurality of filler particles is between 0.3 wt % and 40 wt %. Moreover, an intrinsic viscosity of the polyester resin matrix material is between 0.5 dL/g and 0.8 dL/g, an intrinsic viscosity of the high viscosity polyester resin material is between 0.9 dL/g and 1.1 dL/g, and the plurality of filler particles have an average particle size of between 0.15 μm and 10 μm.

Therefore, the biaxially stretched polyester film of the present disclosure can exhibit a matte effect on its single sided surface through the technical solutions of "a matte layer being formed on a side surface of the polyester resin base layer, in which the matte layer includes: a polyester resin matrix, a high viscosity polyester resin, and a plurality of filler particles" and "(1) based on the total weight of the matte layer, a content of the polyester resin matrix is between 50 wt % and 95 wt %, in which an intrinsic viscosity of the polyester resin matrix is between 0.5 dL/g and 0.8 dL/g; (2) a content of the high viscosity polyester resin is between 0.01 wt % and 5 wt %, in which the high viscosity polyester resin is dispersed in the polyester resin matrix, and an intrinsic viscosity of the high viscosity polyester resin is between 0.9 dL/g and 1.1 dL/g; (3) a content of the plurality of filler particles is between 0.3 wt % and 40 wt %, in which the plurality of filler particles are also dispersed in the polyester resin matrix, and the plurality of filler particles have an average particle size of between 0.15 μm and 10 μm." Moreover, the entire biaxially stretched polyester film can still maintain good transparency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Biaxially Stretched Polyester Film

Figure 1:
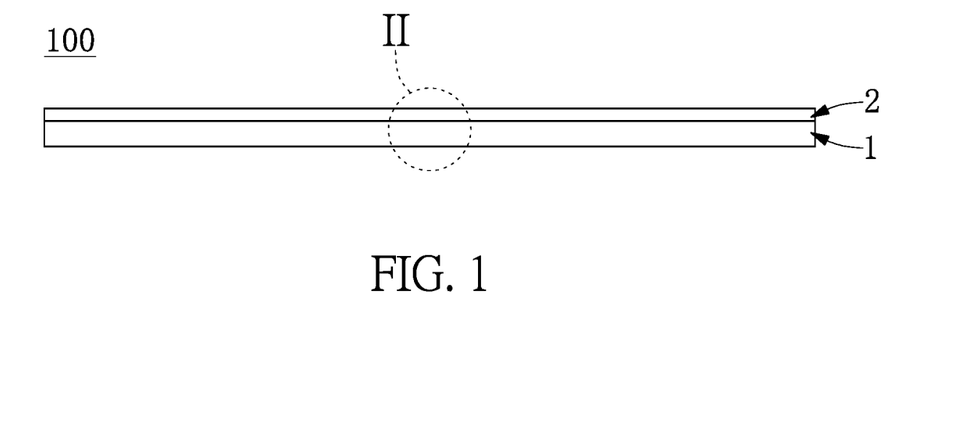
FIG. 1 is a cross-sectional view of a biaxially stretched polyester film according to an embodiment of the present disclosure.
Figure 2:
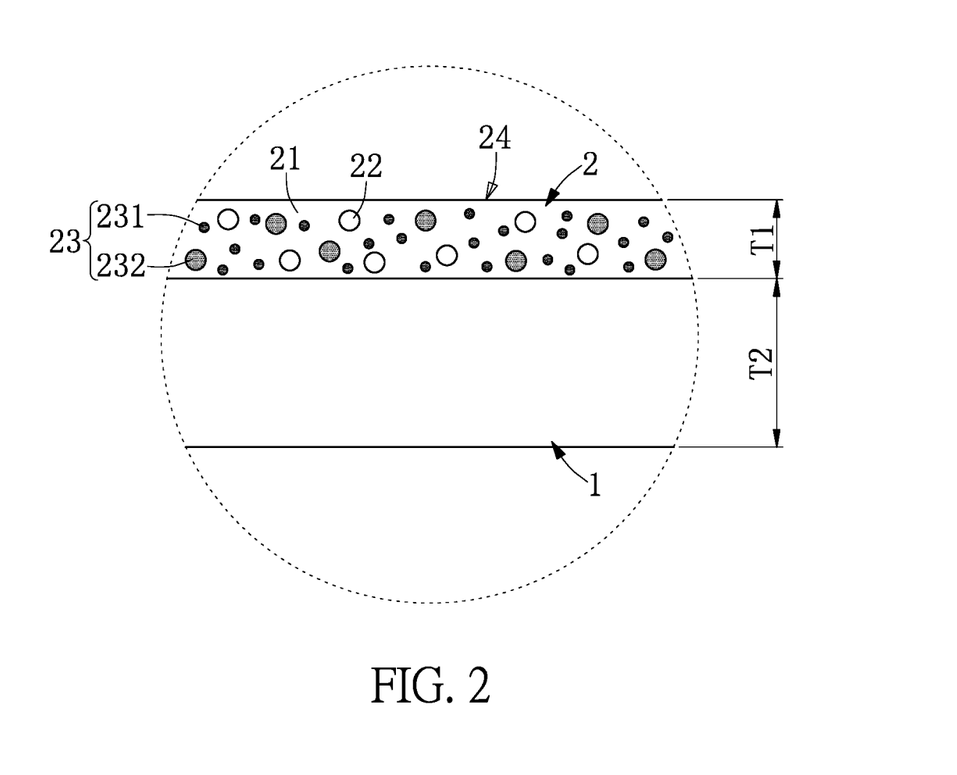
FIG. 2 is a partial enlarged view of a region II of FIG. 1.

Referring to FIG. 1 and FIG. 2, the present embodiment discloses a biaxially stretched polyester film 100 (also called biaxially oriented polyester film, BOPET film) The biaxially stretched polyester film 100 includes a polyester resin base layer 1 and a matte layer 2 formed on a side surface of the polyester resin base layer 1. More specifically, the biaxially stretched polyester film 100 is formed by the polyester resin base layer 1 and the matte layer 2, and the biaxially stretched polyester film 100 is formed through a co-extrusion process and a biaxial-stretching process sequentially.

By the composition selection and the concentration adjustment of the matte layer 2, the biaxially stretched polyester film 100 can exhibit a matte effect on its single sided surface. That is, one side surface of the biaxially stretched polyester film 100 can exhibit a matte effect, while the entire biaxially stretched polyester film 100 can still maintain good transparency.

In order to achieve the above objectives, the polyester resin base layer 1 of the present embodiment has a thickness T1 ranging from 1 μm to 100 μm, and preferably ranging from 10 μm to 100 μm.

In addition, the material of the polyester resin base layer 1 is a polymer prepared from a condensation reaction between a dibasic acid and a diol or a derivative thereof. That is, the matrix material of the polyester resin base layer 1 is mainly a polyester material. Preferably, the polyester material is polyethylene terephthalate (PET) or polyethylene naphthalate (PEN), but the present disclosure is not limited thereto. Accordingly, the polyester resin base layer 1 enables the entire biaxially stretched polyester film 100 to have good transparency, and the polyester resin base layer 1 can provide good support to the matte layer 2. It should be noted that the polyester resin base layer 1 may also be added with filler particles as described below according to practical requirements (not shown), and a weight percent concentration of the filler particles in the polyester resin base layer 1 is less than a weight percent concentration of the filler particles in the matte layer 2 as described below.

If the thickness T1 of the polyester resin base layer 1 is greater than the upper limit of the above thickness range, the transparency of the biaxially stretched polyester film 100 will be deteriorated. Conversely, if the thickness T1 of the polyester resin base layer 1 is less than the lower limit of the above thickness range, the polyester resin base layer 1 cannot provide good support to the matte layer 2.

It is worth mentioning that the above-mentioned raw material dibasic acid that forms the polyester material is at least one selected from the group consisting of terephthalic acid, isophthalic acid, 1,5-naphthalene dicarboxylic acid, 2,6-naphthalene dicarboxylic acid 2,6-naphthalene dicarboxylic acid, 1,4-naphthalene dicarboxylic acid, dibenzoic acid, diphenylethane dicarboxylic acid, diphenylphosphonium dicarboxylic acid, indole-2,6-dicarboxylic acid, 1,3-cyclopentanedicarboxylic acid, 1,3-cyclohexanedicarboxylic acid, 1,4-cyclohexanedicarboxylic acid, malonic acid, dimethylmalonic acid, succinic acid, diethyl 3,3-succinate, glutaric acid, 2,2-dimethylglutaric acid, adipic acid, 2-methyladipate, trimethyl adipate, pimelic acid, azelaic acid, azelaic acid, suberic acid, and dodecanedioic acid.

In addition, the above-mentioned raw material diol that forms the polyester material is at least one selected from the group consisting of ethylene glycol, propylene glycol, hexamethylene glycol, neopentyl glycol, 1,2-cyclohexanedimethanol, 1,4-cyclohexanedimethanol, 1,10-decanediol, 1,3-propanediol, 1,4-butanediol, 1,5-pentanediol, 1,6-hexanediol, and 2,2-bis(4-hydroxyphenyl)propane, and bis(4-hydroxyphenyl)anthracene.

In order to achieve the above objectives, the matte layer 2 of the present embodiment has a thickness T2 ranging from 1 µm to 100 µm, and preferably ranging from 5 µm to 85 µm.

If the thickness T2 of the matte layer 2 is greater than the upper limit of the above thickness range, the transparency of the biaxially stretched polyester film 100 will be deteriorated. Conversely, if the thickness T2 of the matte layer 2 is less than the lower limit of the above thickness range, the haze of the matte layer 2 will become insufficient, so that the matte layer 2 cannot achieve the desired physicochemical properties.

Further, the matte layer 2 includes a polyester resin matrix 21, a high viscosity polyester resin 22, and a plurality of filler particles 23. The high viscosity polyester resin 22 and the plurality of filler particles 23 are uniformly dispersed in the polyester resin matrix 21.

In terms of the content of each component, based on the total weight of the matte layer 2 that is 100 wt %, a content of the polyester resin matrix 21 is between 50 wt % and 95 wt %, a content of the high viscosity polyester resin 22 is between 0.01 wt % and 5 wt %, and a content of the plurality of filler particles 23 is between 0.3 wt % and 40 wt %, and preferably between 0.3 wt % and 25 wt %.

In terms of the physicochemical property of each component, an intrinsic viscosity of the polyester resin matrix 21 is between 0.5 dL/g and 0.8 dL/g. That is, the polyester resin matrix 21 is a polyester resin that has an intermediate viscosity. Different from the polyester resin matrix 21, an intrinsic viscosity of the high viscosity polyester resin 22 is between 0.9 dL/g and 1.1 dL/g.

According to the selections of the contents and intrinsic viscosities of the polyester resin matrix 21 and the high viscosity polyester resin 22, the light passing through the matte layer 2 can be scattered due to differences in the molecular weights and the shrinkage ratios between the polyester resin matrix 21 and the high viscosity polyester resin 22, and the compatibility between the polyester resin matrix 21 and the high viscosity polyester resin 22 is poor. Accordingly, the biaxially stretched polyester film 100 can exhibit a matte effect on its single sided surface, while the entire biaxially stretched polyester film 100 can still maintain good transparency.

However, if the content of the high viscosity polyester resin 22 is greater than the upper limit of the above content range (i.e. greater than 5 wt %), the haze value of the matte layer 2 will become too high, and the high viscosity polyester resin 22 cannot be uniformly dispersed in the polyester resin matrix 21, so that the film formation of the matte layer 2 may have defects, and the transparency of the entire biaxially stretched polyester film 100 will be deteriorated. Conversely, if the content of the high viscosity polyester resin 22 is less than the lower limit of the above content range (i.e. less than 0.01 wt %), the haze value of the matte layer 2 will become insufficient.

It is worth mentioning that in the matte layer 2, the materials of the polyester resin matrix 21 and the high viscosity polyester resin 22 are also polymers prepared by a condensation reaction between a dibasic acid and a diol or a derivative thereof. That is, the materials of the polyester resin matrix 21 and the high viscosity polyester resin 22 are both polyester materials. Since in the biaxially stretched polyester film 100 of the present embodiment, the matrix materials respectively used in the polyester resin base layer 1 and the matte layer 2 are both the polyester materials, the biaxially stretched polyester film 100 can have good productivity and processability. In addition, the scrap material generated from the biaxially stretched polyester film 100 during the production process can also be recycled into the production process as a recycled material, and the film produced from the recycled material does not cause yellowing.

It is also worth mentioning that in the present embodiment, the intrinsic viscosity of the polyester material of the polyester resin base layer 1 is also between 0.5 dL/g and 0.8 dL/g. That is, the polyester material of the polyester resin base layer 1 is also a polyester resin having an intermediate viscosity, but the present disclosure is not limited thereto.

Further, in the present embodiment, an average particle size of the plurality of filler particles 23 is between 0.15 µm and 10 µm. Based on the total weight of the matte layer 2, a content of the plurality of filler particles 23 is between 0.3 wt % and 40 wt %, and preferably between 0.3 wt % and 25 wt %.

Accordingly, when a light ray passes through the matte layer 2, the light ray can be scattered by the matte layer 2 due to the introduction of the plurality of filler particles 23. The biaxially stretched polyester film 100 can exhibit a matte effect on its single sided surface, while the entire biaxially stretched polyester film 100 can still maintain good transparency.

In other words, by introducing the high viscosity polyester resin 22 and the plurality of filler particles 23 into the matte layer 2 and by the parameter selections of each component that includes content range and physicochemical property, the biaxially stretched polyester film 100 can exhibit a matte effect on its single sided surface, while the entire biaxially stretched polyester film 100 can still maintain good transparency.

In terms of content, if the content of the plurality of filler particles 23 is greater than the upper limit of the above content range (i.e. greater than 40 wt %), the haze value of the matte layer 2 will become too high, the plurality of filler particles 23 cannot be uniformly dispersed in the polyester resin matrix 21, and the plurality of filler particles 23 may aggregate with each other. Therefore, the overall transparency of the biaxially stretched polyester film 100 may be deteriorated. Conversely, if the content of the plurality of filler particles 23 is less than the lower limit of the above content range (i.e. less than 0.3 wt %), the haze value of the matte layer 2 will become insufficient. In terms of average particle size, if the average particle size of the plurality of filler particles 23 is greater than the upper limit of the above average particle size range, the overall transparency of the biaxially stretched polyester film 100 will be deteriorated. Conversely, if the average particle size of the plurality of filler particles 23 is less than the lower limit of the above average particle size range, the surface roughness of the matte layer 2 will become too low.

Further, in the present embodiment, the plurality of filler particles 23 can be further divided into a plurality of first filler particles 231 and a plurality of second filler particles 232 in accordance with the difference in average particle size. The plurality of first filler particles 231 and the plurality of second filler particles 232 are mixed with each other, the plurality of first filler particles 231 have a first average particle size, and the plurality of second filler particles 232 has a second average particle size.

The first average particle size of the plurality of first filler particles 231 is between 0.15 μm and 2 μm, and the second average particle size of the plurality of second filler particles 232 is between 2 μm and 10 μm. In addition, an absolute value of a difference between the first average particle size of the plurality of first filler particles 231 and the second average particle size of the plurality of second filler particles 232 is not less than 1 μm, and preferably not less than 3 μm.

In an embodiment of the present disclosure, the plurality of first filler particles 231 and second filler particles 232 are spherical or irregularly shaped silicon dioxide particles, but the present disclosure is not limited thereto. For example, the materials of the first filler particles 231 and second filler particles 232 may be respectively selected from the group consisting of silicon dioxide, titanium dioxide, cerium dioxide, aluminum hydroxide, magnesium hydroxide, aluminum oxide, magnesium oxide, boron oxide, calcium oxide, calcium carbonate, barium carbonate, strontium titanate, barium titanate, calcium titanate, magnesium titanate, calcium sulfate, barium sulfate, lithium phosphate, calcium phosphate, magnesium phosphate, boron nitride, aluminum nitride, carbon black, talc, kaolinite, and crosslinked polymer.

It is also worth mentioning that in an embodiment of the present disclosure, the plurality of first filler particles 231 and the plurality of second filler particles 232 are mixed with each other based on a weight ratio range between 1:9 and 9:1, so that a particle size distribution curve obtained by a dynamic light scattering method (DLS) of a mixture mixed by the plurality of first filler particles 231 and the plurality of second filler particles 232 exhibits a single-peak distribution. Accordingly, the uniformity of the surface roughness of the matte layer 2 can be effectively improved, and the biaxially stretched polyester film 100 can have a low gloss matte surface and achieve a high transparency effect.

According to the above configuration, a side surface 24 of the matte layer 2 opposite to the polyester resin base layer 1 (i.e. the outer surface 24 of the matte layer 2) has an average roughness (Ra) of between 200 nm and 1,000 nm. The entire biaxially stretched polyester film 100 of the present embodiment has a transparency (at the visible wavelength range) of not less than 80%, a gloss value of not more than 60% (preferably between 30% and 55%), and a haze value of not less than 4% (preferably between 40% and 80%).

Based on the above physicochemical properties, the biaxially stretched polyester film 100 of the present embodiment is particularly suitable for use as a release film, a barrier film, or a special packaging material.

In an embodiment of the present disclosure, when the biaxially stretched polyester film 100 is used as the release film, the matte layer 2 of the biaxially stretched polyester film 100 may be coated with a release agent. In other words, the biaxially stretched polyester film 100 may serve as a substrate for coating various types of resins, such as thermoplastic polyurethane (TPU) and chlorinated polypropylene resin (CPP).

In an embodiment of the present disclosure, when the biaxially stretched polyester film 100 is used as the barrier film, the matte layer 2 of the biaxially stretched polyester film 100 can be vapor-deposited with an inorganic material to improve the effect of blocking moisture and gas.

In an embodiment of the present disclosure, since the biaxially stretched polyester film 100 has a single-sided matte and high transparency property, the biaxially stretched polyester film 100 is also particularly suitable for use as the special package.

Method for Producing the Polyester Film

The related description of the biaxially stretched polyester film 100 is described above, and a method for producing the biaxially stretched polyester film 100 will be described below according to an embodiment of the present disclosure.

Figure 3:
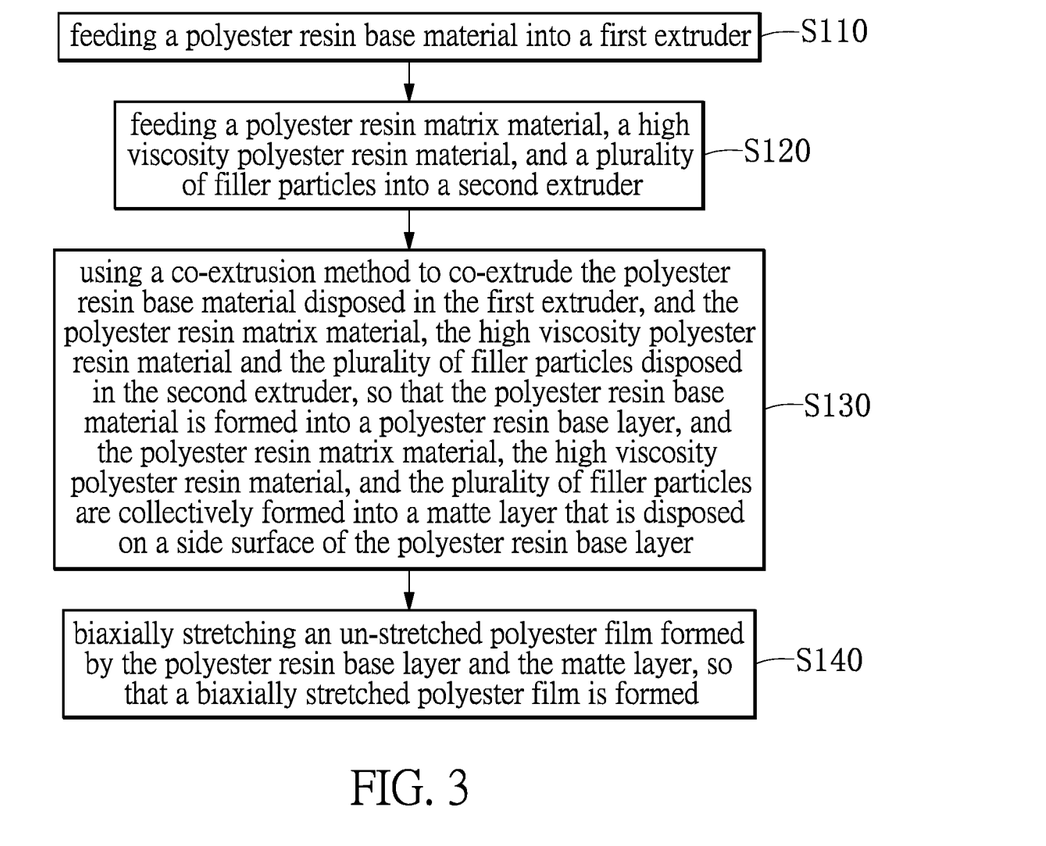
FIG. 3 is a flow chart of a method for producing the biaxially stretched polyester film according to the embodiment of the present disclosure.
Figure 4:
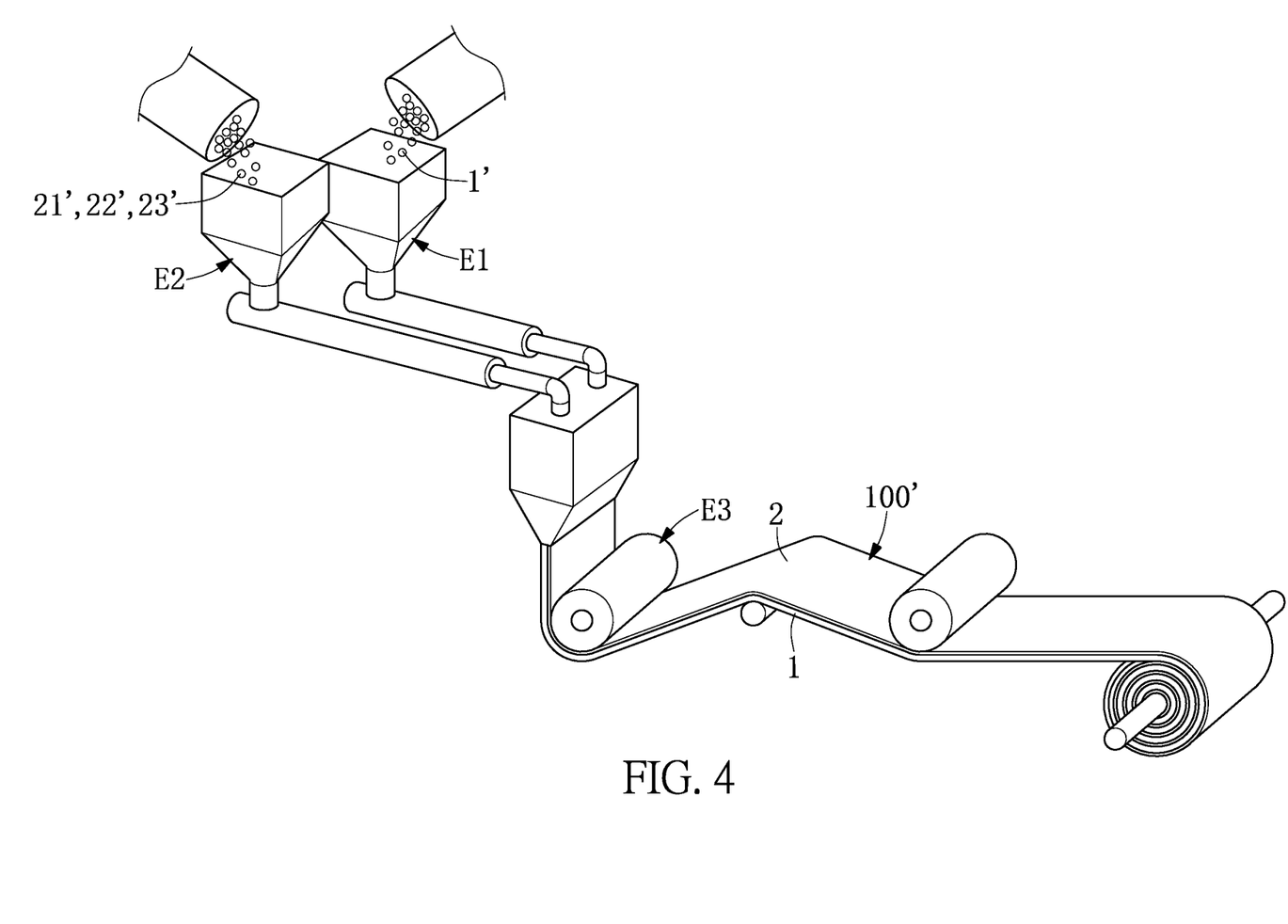
FIG. 4 is a schematic view of a co-extrusion extruder according to the embodiment of the present disclosure.

Referring to FIG. 3 and FIG. 4, the present embodiment discloses a method for producing the biaxially stretched polyester film 100. The method for producing the biaxially stretched polyester film 100 includes step S110, step S120, step S130, and step S140. It should be noted that the order of the steps described in the present embodiment and the actual way of operation may be adjusted according to practical requirements, and the present disclosure is not limited thereto.

The step S110 includes feeding a polyester resin base material 1' into a first extruder E1, and then melting the polyester resin base material 1' at a high temperature of between 260° C. and 300° C. Moreover, an intrinsic viscosity of the polyester resin base material 1' is between 0.5 dL/g and 0.8 dL/g. That is, the polyester resin base material 1' is a polyester resin having an intermediate viscosity.

The step 120 includes feeding a polyester resin matrix material 21', a high viscosity polyester resin material 22', and a plurality of filler particles 23' into a second extruder E2, and then melting and mixing the polyester resin matrix material 21', the high viscosity polyester resin material 22', and the plurality of filler particles 23' at the high temperature of between 260° C. and 300° C. Moreover, an intrinsic viscosity of the polyester resin matrix material 21' is between 0.5 dL/g and 0.8 dL/g. That is, the polyester resin matrix material 21' is also a polyester resin having an intermediate viscosity. In addition, an intrinsic viscosity of the high viscosity polyester resin material 22' is between 0.9 dL/g and 1.1 dL/g, and the plurality of filler particles 23' have an average particle size of between 0.15 μm and 10 μm.

The step 130 includes using a co-extrusion method to co-extrude the polyester resin base material 1' disposed in the first extruder E1, and the polyester resin matrix material 21', the high viscosity polyester resin material 22' and the plurality of filler particles 23' disposed in the second extruder E3, and then rapid cooling the extruded materials via a cooled drum E3 (i.e. a drum cooled to 20° C. to 50° C.), so that the polyester resin base material 1' is formed into a polyester resin base layer 1, and the polyester resin matrix material 21', the high viscosity polyester resin material 22', and the plurality of filler particles 23' are collectively formed into a matte layer 2 that is disposed on a side surface of the polyester resin base layer 1. Accordingly, the polyester resin base layer 1 and the matte layer 2 together form an un-stretched polyester film 100'.

The step 140 includes biaxially stretching the un-stretched polyester film 100' formed by the polyester resin base layer 1 and the matte layer 2, so that the un-stretched polyester film 100' is formed into a biaxially stretched polyester film 100.

Further, the biaxial stretching method may be, for example, a longitudinal uniaxial stretching method, a transverse uniaxial stretching method, a vertical axis-horizontal axis sequential biaxial stretching method, or a vertical axis-horizon axis simultaneous biaxial stretching method, and the present disclosure is not limited thereto. In addition, the above biaxial stretching method may, for example, preheat the un-stretched polyester film 100' at an extension temperature of between 50° C. and 150° C. The biaxial stretching method further includes applying a stretching process of 2.0 times to 5.0 times, and preferably 3.0 times to 4.0 times, in a width direction (or lateral direction, LD) of the un-stretched polyester film 100' according to different elongation ratios; and then applying a stretching process of 1.0 times to 3.0 times, and preferably 1.0 times to 2.5 times, in a length direction (or longitudinal direction, LD) of the un-stretched polyester film 100'.

Moreover, based on the total weight of the matte layer 2, a content of the polyester resin matrix material 21' is between 50 wt % and 95 wt %, a content of the high viscosity polyester resin material 22' is between 0.01 wt % and 5 wt %, and a content of the plurality of filler particles 23' is between 0.3 wt % and 40 wt %.

According to the above method for producing the biaxially stretched polyester film 100, a side surface 24 of the matte layer 2 opposite to the polyester resin base layer 1 has an average roughness (Ra) of between 200 nm and 1,000 nm, and the entire biaxially stretched polyester film 100 has a transparency of not less than 80%, a gloss value of not more than 60% (preferably between 20% and 40%), and a haze value of not less than 4%.

Experimental Results

Hereinafter, exemplary examples 1 to 4 and comparative examples 1 to 2 will now be described in detail. However, the exemplary examples are only used to help understand the present disclosure, and the scope of the present disclosure is not limited to these examples.

The biaxially stretched polyester film of the exemplary examples 1 to 4 and the comparative examples 1 to 2 can be produced by referring to the above steps S110 to S140.

Among them, the content of each component and the process parameters are shown in Table 1 below.

Further, the biaxially stretched polyester films of the exemplary examples 1 to 4 and the comparative examples 1 to 2 were subjected to different physical property tests to obtain different physicochemical properties, such as the surface roughness of the polyester film, and the transparency, gloss value, and haze value of the entire polyester film. The relevant test methods are described below, and the relevant test results are shown in Table 1 below.

The roughness test includes: using a three-dimensional surface roughness meter (Otaru Research Institute, trade name. SURF CORDER SE-3CK) to test the center line average roughness (Ra) and the ten-point average roughness (Rz) of the surfaces of the biaxially stretched polyester films of the exemplary examples 1 to 4 and the comparative examples 1 to 2 according to JIS B0601 and JIS B0651 under the conditions of stylus tip R2ym, scanning pitch 2µπl, scanning length 1 mm, scanning strips 100, cut-off value 0.25 mm and magnification of 5,000 times. The roughness listed in Table 1 is the center line average roughness (Ra).

The transparency/haze test includes: using a haze meter (TC-HIII produced by Tokyo Denshoku Co., Ltd.) to test the transparency (light transmittance) and the haze value of the biaxially stretched polyester films of the exemplary examples 1 to 4 and the comparative examples 1 to 2 according to JIS K7705.

The gloss test includes: using a gloss meter (VGS-SENSOR produced by Nippon Denshoku Industries Co., Ltd.) to test the gloss value (G60) of the biaxially stretched polyester films of the exemplary examples 1 to 4 and the comparative examples 1 to 2 according to JIS Z 8741. The test conditions were as follows: the incident angle and the acceptance angle were both 60° (N=5), and the average value was used.

Table 1 shows the material parameters and test results of the exemplary and comparative examples.

| | terms | exemplary example 1 | exemplary example 2 | exemplary example 3 | exemplary example 4 |
|---|---|---|---|---|---|
| matte layer | thickness of matte layer (µm) | 9 | 80 | 20 | 80 |
| | content of polyester resin matrix (wt %) | 98.2 | 98.8 | 80.0 | 98.3 |
| | intrinsic viscosity of polyester resin matrix (dL/g) | 0.6 | 0.6 | 0.8 | 0.6 |
| | content of high viscosity polyester resin (wt %) | 0.01 | 0.01 | 0.01 | 0.50 |
| | intrinsic viscosity of high viscosity polyester resin (dL/g) | 0.9 | 0.9 | 1.1 | 1.1 |
| | total content of filler particles (wt %) | 1.8 | 1.2 | 20.0 | 1.2 |
| | content of first filler particles (wt %) | 1.6 | 1.0 | 2.0 | 1.0 |
| | average particle size of first filler particles (µm) | 2.5 | 6.0 | 5.0 | 6.0 |
| | content of second filler particles (wt %) | 0.2 | 0.2 | 18.0 | 0.2 |
| | average particle size of second filler particles (µm) | 1.4 | 1.4 | 2.0 | 1.4 |
| polyester resin base layer | thickness of polyester resin base layer (µm) | 12 | 100 | 80 | 20 |
| | content of polyester resin base material (wt %) | 100 | 99.8 | 99.5 | 99.8 |
| | intrinsic viscosity of polyester resin base material (dL/g) | 0.6 | 0.6 | 0.8 | 0.6 |

-continued

|  |  |  |  |  |  |
|---|---|---|---|---|---|
|  | total content of filler particles (wt %) | — | 0.20 | 0.5 | 0.20 |
|  | content of third filler particles (wt %) | — | 0.10 | 0.25 | 0.10 |
|  | average particle size of third filler particles (μm) | — | 0.15 | 0.3 | 0.15 |
|  | content of fourth filler particles (wt %) | — | 0.10 | 0.25 | 0.10 |
|  | average particle size of fourth filler particles (μm) | — | 1.5 | 1.3 | 1.5 |
| test results | surface roughness (Ra) of matte surface (nm) | 287 | 607 | 824 | 738 |
|  | surface roughness (Ra) of flat surface (nm) | 172 | 314 | 203 | 235 |
|  | ratio of Ra of matte surface to Ra of flat surface | 1.66 | 1.93 | 4.06 | 3.14 |
|  | transparency of entire polyester film (%) | 84.7 | 83.9 | 84.3 | 84.5 |
|  | gloss value of matte surface (%) | 34 | 50 | 53 | 54 |
|  | gloss value of flat surface (%) | 70 | 70 | 71 | 70 |
|  | ratio of gloss values of matte surface to flat surface | 0.49 | 0.71 | 0.75 | 0.77 |
|  | haze value of entire polyester film (%) | 58.08 | 72.76 | 73.8 | 74.2 |

|  | terms | comparative example 1 | comparative example 2 |
|---|---|---|---|
| matte layer | thickness of matte layer (μm) | — | — |
|  | content of polyester resin matrix (wt %) | — | — |
|  | intrinsic viscosity of polyester resin matrix (dL/g) | — | — |
|  | content of high viscosity polyester resin (wt %) | — | — |
|  | intrinsic viscosity of high viscosity polyester resin (dL/g) | — | — |
|  | total content of filler particles (wt %) | — | — |
|  | content of first filler particles (wt %) | — | — |
|  | average particle size of first filler particles (μm) | — | — |
|  | content of second filler particles (wt %) | — | — |
|  | average particle size of second filler particles (μm) | — | — |
| polyester resin base layer | thickness of polyester resin base layer (μm) | 12 | 100 |
|  | content of polyester resin base material (wt %) | 99.7 | 99.8 |
|  | intrinsic viscosity of polyester resin base material (dL/g) | 0.6 | 0.6 |
|  | total content of filler particles (wt %) | 0.3 | 0.2 |
|  | content of third filler particles (wt %) | 0.3 | 0.2 |
|  | average particle size of third filler particles (μm) | 1.4 | 1.4 |
|  | content of fourth filler particles (wt %) | — | — |
|  | average particle size of fourth filler particles (μm) | — | — |
| test results | surface roughness (Ra) of matte surface (nm) | 18 | 24 |
|  | surface roughness (Ra) of flat surface (nm) | 18 | 24 |
|  | ratio of Ra of matte surface to Ra of flat surface | 1 | 1 |
|  | transparency of entire polyester film (%) | 89.0 | 88.4 |
|  | gloss value of matte surface (%) | 165 | 167 |
|  | gloss value of flat surface (%) | 165 | 167 |

-continued

| | | |
|---|---|---|
| ratio of gloss values of matte surface to flat surface | 1 | 1 |
| haze value of entire polyester film (%) | 3.26 | 4.62 |

Discussion of Test Results

According to the material and process parameters of the exemplary and comparative examples as shown in Table 1, the polyester films having one-sided matte surface of the exemplary examples 1 to 4 all have a transparency of not less than 80% and a matte surface gloss value of not more than 60%. Further, when the thickness of the matte layer is relatively thick, the matte layer can use a lower filler particle content, which still achieves the same effect. For example, the thickness of the matte layer of the exemplary example 3 is 20 μm, and the total content of the filler particles is 20 wt %. The thickness of the matte layer of the exemplary example 4 is 80 μm, and the total content of the filler particles is 1.2 wt % (lower filler particle content). It is worth mentioning that the polyester resin base layers in the exemplary examples 2 to 4 are also added with a plurality of filler particles (i.e. third filler particles and fourth filler particles) depending on the design requirements of the product. Moreover, a weight percent concentration of the plurality of filler particles in the polyester resin base layer is less than a weight percent concentration of the plurality of filler particles in the matte layer, and the weight percent concentration of the plurality of filler particles in the polyester resin base layer is not more than 20% of the weight percent concentration of the plurality of filler particles in the matte layer. Further, in the polyester films of the exemplary examples 1 to 4, a ratio of the surface roughness of the matte surface to the surface roughness of the flat surface is not less than 1.5 and is substantially between 1.5 and 4.5; and a ratio of the gloss value of the matte surface to the gloss value of the flat surface is not more than 0.85 and is substantially between 0.45 and 0.85. It should be noted that the above "matte surface" refers to the outer surface of the matte layer, and the above "flat surface" refers to the outer surface of the polyester resin base layer.

The polyester films of the comparative examples 1 to 2 do not have any matte layer. The filler particles are added to the polyester resin base layer of the polyester film, but the content of the filler particles is less than 0.3 wt %. Although the transparency of the polyester film of the comparative examples is more than 80%, the gloss value and the haze value are both low, which cannot achieve the matte effect of the exemplary examples.

Advantageous Effect

In conclusion, the biaxially stretched polyester film of the present embodiment can exhibit a matte effect on its single sided surface through the technical solutions of "a matte layer 2 being formed on a side surface of the polyester resin base layer 1, in which the matte layer 2 includes: a polyester resin matrix 21, a high viscosity polyester resin 22, and a plurality of filler particles 23" and "(1) based on the total weight of the matte layer 2, a content of the polyester resin matrix 21 is between 50 wt % and 95 wt %, in which an intrinsic viscosity of the polyester resin matrix 21 is between 0.5 dL/g and 0.8 dL/g; (2) a content of the high viscosity polyester resin 22 is between 0.01 wt % and 5 wt %, in which the high viscosity polyester resin 22 is dispersed in the polyester resin matrix 21, and an intrinsic viscosity of the high viscosity polyester resin 22 is between 0.9 dL/g and 1.1 dL/g; (3) a content of the plurality of filler particles 23 is between 0.3 wt % and 40 wt %, in which the plurality of filler particles 23 are also dispersed in the polyester resin matrix 21, and the plurality of filler particles 23 have an average particle size of between 0.15 μm and 10 μm." Moreover, the entire biaxially stretched polyester film 100 can still maintain good transparency.

Further, since in the biaxially stretched polyester film 100 of the present embodiment, the matrix materials respectively used in the polyester resin base layer 1 and the matte layer 2 are both the polyester materials, the biaxially stretched polyester film 100 can have good productivity and processability. In addition, the scrap material generated from the biaxially stretched polyester film 100 during the production process can also be recycled into the production process as a recycled material, and the film produced from the recycled material does not cause yellowing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A biaxially stretched polyester film, comprising:
   a polyester resin base layer; wherein a thickness of the polyester resin base layer is between 20 μm and 100 μm; and
   a matte layer formed on a side surface of the polyester resin base layer; wherein a thickness of the matte layer is between 20 μm and 80 μm, the matte layer includes: a polyester resin matrix, a polyester resin filler, and a plurality of filler particles, and based on the total weight of the matte layer,
   (1) a content of the polyester resin matrix is between 80 wt % and 98.8 wt %, wherein an intrinsic viscosity of the polyester resin matrix is between 0.6dL/g and 0.8dL/g;
   (2) a content of the polyester resin filler is between 0.01 wt % and 0.5 wt %, wherein the polyester resin filler is dispersed in the polyester resin matrix, and an intrinsic viscosity of the polyester resin filler is between 0.9dL/g and 1.1dL/g; and
   (3) a total content of the plurality of filler particles is between 1.2 wt % and 20 wt %, wherein the plurality of filler particles are also dispersed in the polyester resin matrix; wherein the plurality of filler particles are further divided into a plurality of first filler particles and a plurality of second filler particles, and the plurality of first filler particles are mixed with the plurality of second filler particles; wherein an average particle size of the first filler particles is between 5 μm and 6 μm, a content of the first filler particles is between 1 wt % and 2 wt %, an average particle size of the second filler particles is between 1.4 μm and 2 μm, and a content of the second filler particles is between 0.2 wt % and 18 wt %;

wherein the polyester resin base layer includes a polyester resin base material, a plurality of third filler particles and a plurality of fourth filler particles; wherein a content of the polyester resin base material is between 99.5 wt % and 99.8 wt %, an intrinsic viscosity of the polyester resin base material is between 0.6dL/g and 0.8dL/g; wherein a content of the third filler particles is between 0.1 wt % and 0.25 wt %, an average particle size of the third filler particles is between 0.15 μm and 0.3 μm, a content of the fourth filler particles is between 0.1 wt % and 0.25 wt %, and an average particle size of the fourth filler particles is between 1.3 μm and 1.5 μm;

wherein an outer surface of the matte layer is defined as a matte surface, and an outer surface of the polyester resin base layer is defined as a flat surface;

wherein a surface roughness (Ra) of the matte surface is between 607 nm and 824 nm, a surface roughness (Ra) of the flat surface is between 203 nm and 314 nm, and a ratio of the surface roughness of the matte surface to the surface roughness of the flat surface is between 1.93 and 4.06;

wherein a gloss value of the matte surface is between 50% and 54%, a gloss value of the flat surface is between 70% and 71%, and a ratio of the gloss value of the matte surface to the gloss value of the flat surface is between 0.71 and 0.77; wherein the gloss value of the matte surface, the gloss value of the flat surface, and the ratio of the gloss value of the matte surface to the gloss value of the flat surface are with respect to G60 values as measured in accordance with JIS Z 8741;

wherein the entire biaxially stretched polyester film has a transparency of between 83.9% and 84.5% and a haze value of between 72.76% and 74.2%.

2. The biaxially stretched polyester film according to claim 1, wherein the polyester resin base layer, the polyester resin matrix, and the polyester resin filler are all the polymers prepared by a condensation reaction between a dibasic acid and a diol; wherein each of the first filler particles is made of at least one material selected from a group consisting of silicon dioxide, titanium dioxide, cerium dioxide, aluminum hydroxide, magnesium hydroxide, aluminum oxide, magnesium oxide, boron oxide, calcium oxide, calcium carbonate, barium carbonate, strontium titanate, barium titanate, calcium titanate, magnesium titanate, calcium sulfate, barium sulfate, lithium phosphate, calcium phosphate, magnesium phosphate, boron nitride, aluminum nitride, carbon black, talc, kaolinite, and crosslinked polymer, and each of the second filler particles is made of at least one material selected from a group consisting of silicon dioxide, titanium dioxide, cerium dioxide, aluminum hydroxide, magnesium hydroxide, aluminum oxide, magnesium oxide, boron oxide, calcium oxide, calcium carbonate, barium carbonate, strontium titanate, barium titanate, calcium titanate, magnesium titanate, calcium sulfate, barium sulfate, lithium phosphate, calcium phosphate, magnesium phosphate, boron nitride, aluminum nitride, carbon black, talc, kaolinite, and crosslinked polymer.

3. A method for producing a biaxially stretched polyester film, comprising:

feeding a polyester resin base material into a first extruder;

feeding a polyester resin matrix material, a polyester resin filler, and a plurality of filler particles into a second extruder;

using a co-extrusion method to co-extrude the polyester resin base material disposed in the first extruder, and the polyester resin matrix material, the polyester resin filler and the plurality of filler particles disposed in the second extruder, so that the polyester resin base material is formed into a polyester resin base layer, and the polyester resin matrix material, the polyester resin filler, and the plurality of filler particles are collectively formed into a matte layer that is disposed on a side surface of the polyester resin base layer; and biaxially stretching an un-stretched polyester film formed by the polyester resin base layer and the matte layer, so that a biaxially stretched polyester film is formed; wherein a thickness of the polyester resin base layer is between 20 μm and 100 μm, and a thickness of the matte layer is between 20 μm and 80 μm;

wherein based on the total weight of the matte layer, a content of the polyester resin matrix material is between 80 wt % and 98.8 wt %, a content of the polyester resin filler is between 0.01 wt % and 0.5 wt %, and a total content of the plurality of filler particles is between 1.2 wt % and 20 wt %;

wherein an intrinsic viscosity of the polyester resin matrix material is between 0.6dL/g and 0.8dL/g, an intrinsic viscosity of the polyester resin filler is between 0.9dL/g and 1.1dL/g; wherein the plurality of filler particles are further divided into a plurality of first filler particles and a plurality of second filler particles, and the plurality of first filler particles are mixed with the plurality of second filler particles; wherein an average particle size of the first filler particles is between 5 μm and 6 μm, a content of the first filler particles is between 1 wt % and 2 wt %, an average particle size of the second filler particles is between 1.4 μm and 2 μm, and a content of the second filler particles is between 0.2 wt % and 18 wt %;

wherein the polyester resin base layer includes the polyester resin base material, a plurality of third filler particles and a plurality of fourth filler particles; wherein a content of the polyester resin base material is between 99.5 wt % and 99.8 wt %, an intrinsic viscosity of the polyester resin base material is between 0.6dL/g and 0.8dL/g; wherein a content of the third filler particles is between 0.1 wt % and 0.25 wt %, an average particle size of the third filler particles is between 0.15 μm and 0.3 μm, a content of the fourth filler particles is between 0.1 wt % and 0.25 wt %, and an average particle size of the fourth filler particles is between 1.3 μm and 1.5 μm;

wherein an outer surface of the matte layer is defined as a matte surface, and an outer surface of the polyester resin base layer is defined as a flat surface;

wherein a surface roughness (Ra) of the matte surface is between 607 nm and 824 nm, a surface roughness (Ra) of the flat surface is between 203 nm and 314 nm, and a ratio of the surface roughness of the matte surface to the surface roughness of the flat surface is between 1.93 and 4.06;

wherein a gloss value of the matte surface is between 50% and 54%, a gloss value of the flat surface is between 70% and 71%, and a ratio of the gloss value of the matte surface to the gloss value of the flat surface is between 0.71 and 0.77; wherein the gloss value of the matte surface, the gloss value of the flat surface, and the ratio of the gloss value of the matte surface to the gloss value of the flat surface are with respect to G60 values as measured in accordance with JIS Z 8741;

wherein the entire biaxially stretched polyester film has a transparency of between 83.9% and 84.5% and a haze value of between 72.76% and 74.2%.

* * * * *